J. W. ADY.
ROAD CLEARER.
APPLICATION FILED APR. 18, 1919.
1,326,560.
Patented Dec. 30, 1919.
2 SHEETS—SHEET 2.
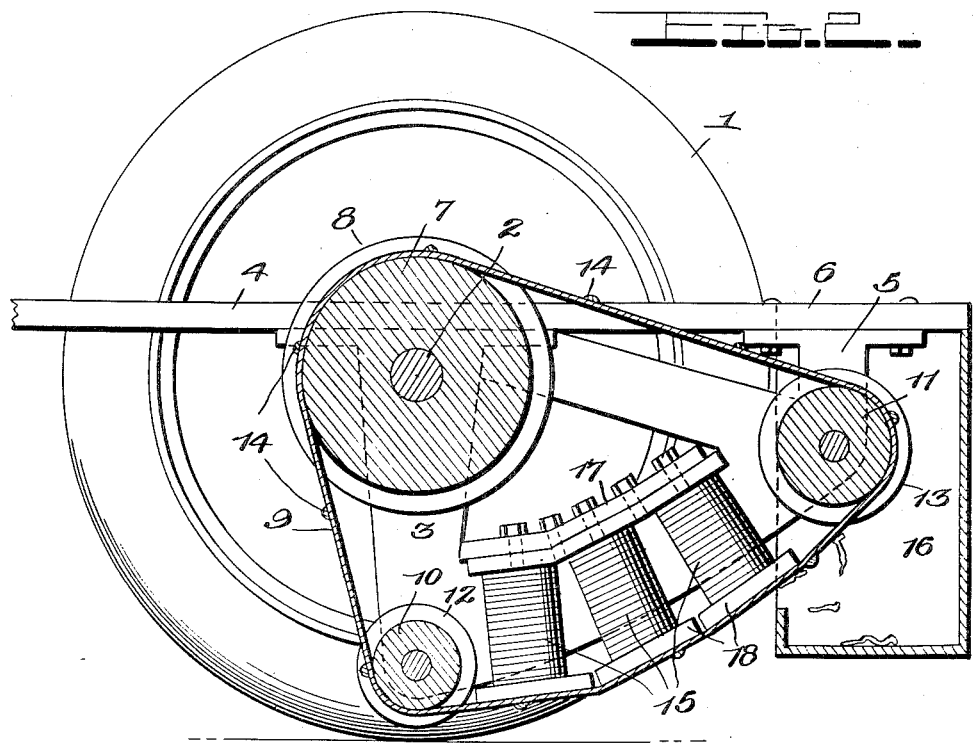
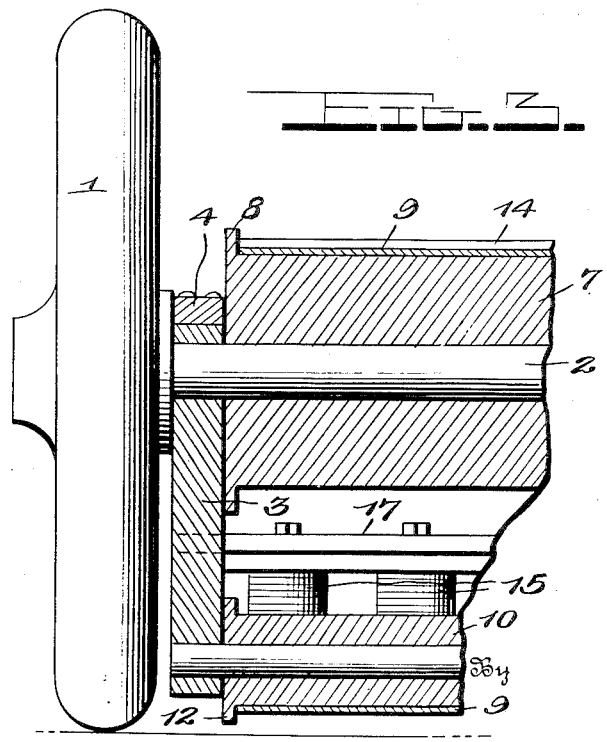
Inventor
Joseph W. Ady
Attorney

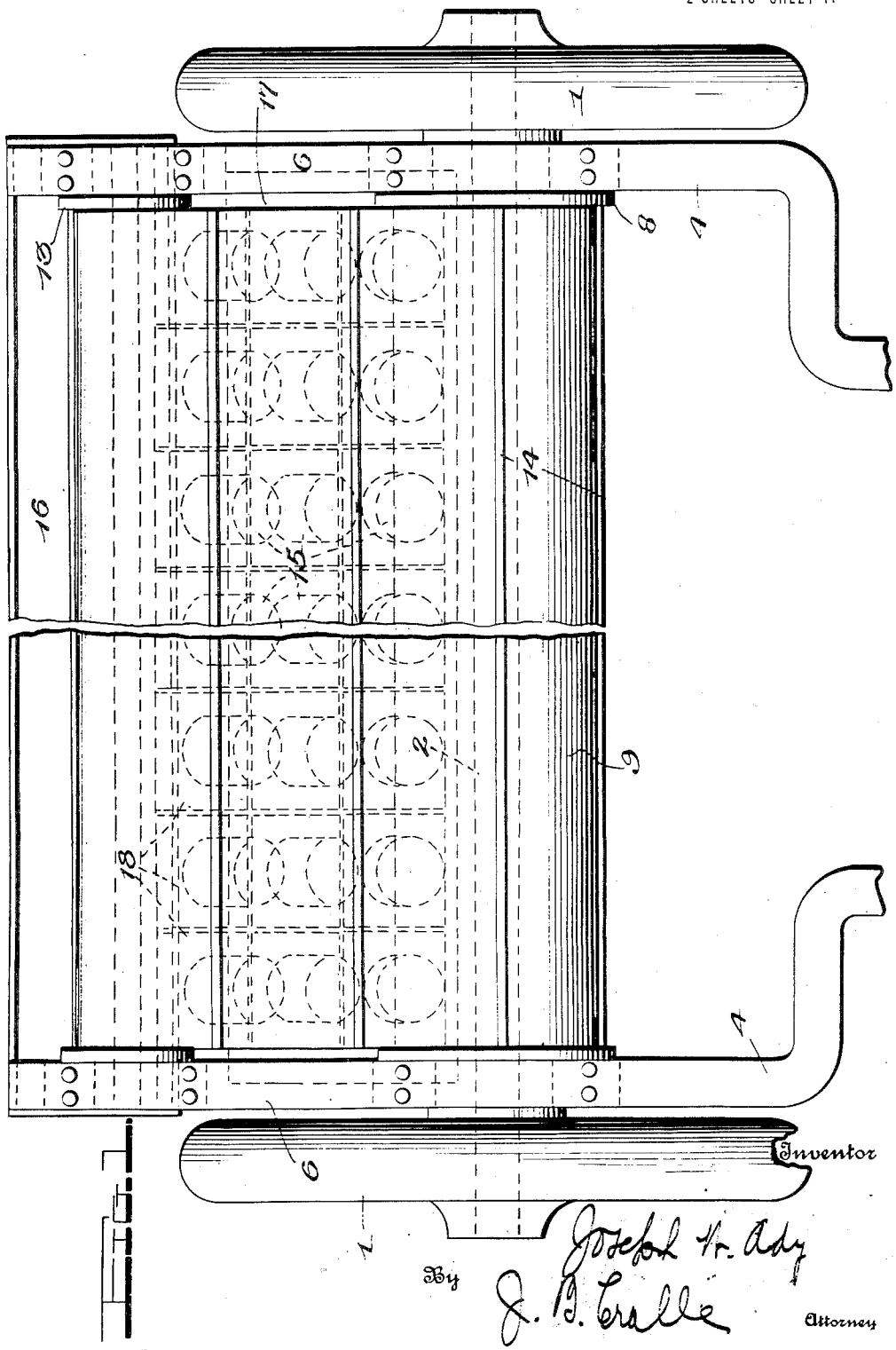

UNITED STATES PATENT OFFICE.

JOSEPH W. ADY, OF COLORADO SPRINGS, COLORADO.

ROAD-CLEARER.

1,326,560.  Specification of Letters Patent.  Patented Dec. 30, 1919.

Application filed April 18, 1919. Serial No. 291,176.

*To all whom it may concern:*

Be it known that I, JOSEPH W. ADY, citizen of the United States, residing at Colorado Springs, in the county of El Paso and State of Colorado, have invented certain new and useful Improvements in Road-Clearers, of which the following is a specification.

This invention appertains to new and useful improvements in road clearers.

The main object is to provide an electromagnet apparatus or device which may be attached to vehicles and which will operate to remove particles of metal from roads by the attractive force of the magnets and remove such attracted particles to a collection receptacle.

Further, the invention resides in those features of construction hereinafter specifically described, claimed and which are disclosed in the annexed drawings, wherein;

Figure 1 is a top plan view of the present invention as applied to a vehicle, parts being omitted;

Fig. 2 is a vertical section thereof longitudinal with respect to the vehicle; and Fig. 3 is a fragmentary, transverse, vertical section.

Employing like characters of reference for corresponding parts throughout, the numeral 1 designates the wheels of a vehicle and 2 an axle which is journaled in vertical brackets 3 secured to the underside of the chassis side frame members 4.

Each bracket 3 is of triangular formation having its rear apex provided with an upward leg extension 5 adapted to be secured to the under side of a rearward horizontal arm 6 which in this instance is an extension of the side frame member 4.

Fixed on axle 2 and extending the distance between the side frame members 4 is a driving pulley or roller 7 having end flanges 8 which serve in guiding and retaining against dislodgment an apron or belt 9, the latter being practically the width of the vehicle.

This belt takes over idler rollers 10 and 11 journaled in the other apices of the triangular bracket 3, each of these rollers having end flanges 12 and 13 respectively. Cleats or strips 14 are fixed on the outside surface of the belt to drag any particles attracted to the belt 9 by the magnets 15 beyond the zone of the latter which zone ceases within a collection receptacle 16. From Fig. 2 it will be seen that the receptacle is secured to the rear ends of arms 6 and houses the rear roller 11.

The magnets 17 are arranged in a plurality of rows on a common integral support 17 connecting the brackets 3 and are of the electro-magnetic type adapted to be energized by a battery or generator (not shown). The rows of magnets are angularly related (see Fig. 2) and the core of each magnet passes through a non-conducting plate 18. These plates are preferably rectangular and compose a magnetized table, as shown in Fig. 1, under which the belt 9 travels. By the angular arrangement of the rows of magnets, the plates 18 provide practically a smooth, rearwardly and upwardly curved or convex surface under which the belt travels. The forward edge of the table is nearest the road and, therefore, will be that part most effective in picking up particles. The rear edge of the table extends within the receptacle 16 to make sure of the deposition of particles into the latter.

In practice, as the vehicle moves over the road bed, the belt is put in motion to deliver particles attracted by the magnets into the receptacle where they are deposited upon passing out of the operative magnetic field.

Having now described this invention and explained the mode of its operation, what I claim is:—

1. In a road clearer, a wheeled vehicle, a forwardly and downwardly inclined, stationary, magnetic surface carried by the vehicle between the wheels thereof, a downwardly facing belt slidable rearwardly across and beneath the magnetic surface and driven by the wheels, and a collection receptacle arranged beneath and extending beyond the rear upper end of the magnetic surface.

2. A road clearer, comprising, in combination with an axle and the side bars of the chassis of a vehicle, a roller fixed on the axle and extending the distance between the side bars of the chassis, a triangular bracket secured to the underside of each side bar and constituting a journal for the axle, said brackets extending rearwardly and each having an upward leg extension on the rear apex, rearward arms carried by the bars, means securing the leg extensions to the arms, rollers journaled between the brackets and in the apices of the latter, an integral support connecting the brackets and having angularly related portions, electro-magnets arranged in depending rows on the angular portions of the support, plates carried by the magnets and defining a rearwardly and upwardly curved table, a belt taking over the rollers and under the table, cleats on the belt, and a receptacle carried by the arms and housing the rear roller to receive the belt from the table for the collection of particles therefrom.

3. A road clearer comprising, in combination with an axle and the side bars of the chassis of a vehicle, a roller fixed on the axle, a bracket secured to each side bar and depending therefrom, said axle being journaled in the brackets, other rollers journaled in the bracket, a plurality of magnets carried by the brackets and arranged to present a magnetic surface extending rearwardly and upwardly, a belt carried by the rollers and passing under the magnets to present its attractive side downwardly facing, and a collection receptacle arranged beneath the belt, the rear portion of the magnetic surface and the rear roller.

4. In a road clearer, a vehicle comprising spaced side bars and an axle and wheels supporting the same, opposing brackets depending from the side bars, a fixed inclined support connecting and carried by the brackets, downwardly facing magnets on the support, and an endless belt taking under the magnets and driven from the axle.

5. In a road clearer, a vehicle comprising spaced side bars and an axle and wheels supporting the same, opposing depending brackets on the side bars, a fixed inclined support connecting and carried by the brackets, said support being inclined upwardly in a rearward direction, downwardly facing magnets on the support, and a roller journaled in the brackets at each end of the support.

In testimony whereof I affix my signature.

JOSEPH W. ADY.